J. Knight,
Furniture Caster.
Nº 15,611. Patented Aug. 26, 1856.

Witnesses:
James P. McLean
Anne S. McLean

Inventor:
Judson Knight

UNITED STATES PATENT OFFICE.

JUDSON KNIGHT, OF NEWARK, NEW JERSEY.

BALL-CASTER FOR TRUNKS AND FURNITURE.

Specification of Letters Patent No. 15,611, dated August 26, 1856.

*To all whom it may concern:*

Be it known that I, JUDSON KNIGHT, of the city of Newark, in the county of Essex and State of New Jersey, have invented a new and useful Improvement in the Construction of Casters for Furniture, Trunks, &c.; and I do hereby declare the following to be a full, clear, and exact description of the same, reference being had to the accompanying drawings, which drawings are lettered to correspond with and make a part of this specification.

Figure 1:
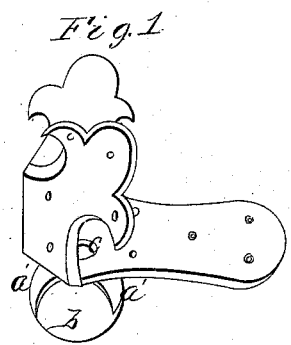

*Description.*—Figure 1, represents an oblique top and side view of a caster attached to, and making a part of a metallic corner of a trunk; ($a$, $a'$,) are three points that extend down below the center or outer periphery of the metallic or mineral ball ($b$,) which ball is held in its place by means of the points ($a$, $a'$,) while it revolves in the open socket ($c$); the points also prevent the balls from falling out of the socket in case the trunk should be raised from the floor. The ball ($b$,) does not revolve upon any fixed center, but simply rolls in any direction required to move the trunk, or other furniture wherein the caster is used, having the bearing or weight upon its upper surface, or periphery, instead of having an axle, or shaft similar to the casters now in use.

Figure 2:
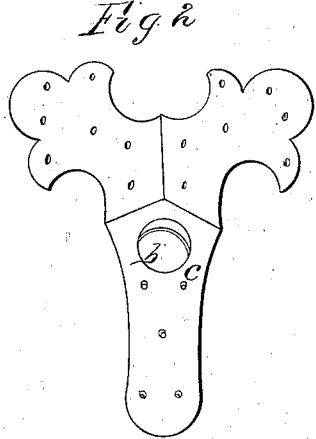

Fig. 2, is a bird's eye view of the top or inside of the caster showing the open socket ($c$.)

I am aware that balls have been applied for antifriction rollers, for railroad gates, and other purposes; but I believe the above mode of keeping the ball in its place (by means of the points ($a$, $a'$,) and these points being a part of a metallic corner of a trunk, (or other furniture,) to be new, novel, and useful.

Therefore I do not claim the separate parts of the caster, as my invention, but

What I claim, and desire to secure by Letters Patent of the United States is—

The combination of the points ($a$, $a'$,) and the ball ($b$,) working in an open socket ($c$,) in the manner and for the purpose substantially as described.

In testimony whereof I hereunto subscribe my name in the presence of two witnesses.

JUDSON KNIGHT.

Witnesses:
 JAMES P. McLEAN,
 ANNE S. McLEAN.